United States Patent [19]

Wawra

[11] 3,898,874

[45] Aug. 12, 1975

[54] CONTROL INPUT SWITCHING APPARATUS

[75] Inventor: Carl Martin Wawra, Bensheim-Auerbach, Germany

[73] Assignee: Firma Carl Schenck AG, Darmstadt, Germany

[22] Filed: Apr. 15, 1974

[21] Appl. No.: 460,788

Related U.S. Application Data

[63] Continuation of Ser. No. 232,851, March 8, 1972, abandoned.

[30] Foreign Application Priority Data

Dec. 23, 1971 Germany.............................. 2164384

[52] U.S. Cl. ........................... 73/90; 328/1; 328/69; 328/104; 328/154
[51] Int. Cl.² .......................................... G01N 3/08
[58] Field of Search ............... 328/1, 2, 35, 69, 104, 328/154; 73/90

[56] References Cited
UNITED STATES PATENTS 2,244,239 6/1941 Blumlein et al................ 178/DIG. 6
3,304,768 2/1967 Naumann et al. ....................... 73/90

*Primary Examiner*—John Zazworsky
*Attorney, Agent, or Firm*—Wolfgang G. Fasse

[57] ABSTRACT

The present control input switching apparatus is useful, especially in connection with hydraulically operated dynamic testing machines for connecting a control input of an adjustment member from one regulator output to another regulator output. For this purpose variable resistor means are connected between the regulator output and the control input. The respective resistor means are simultaneously varied so that one resistance increases while the other resistance decreases and vice versa to assure a smooth transition. The resistor means may, for example, be light sensitive resistors and light source means connected to an integrating circuit may be used to vary these light sensitive resistor means.

20 Claims, 6 Drawing Figures

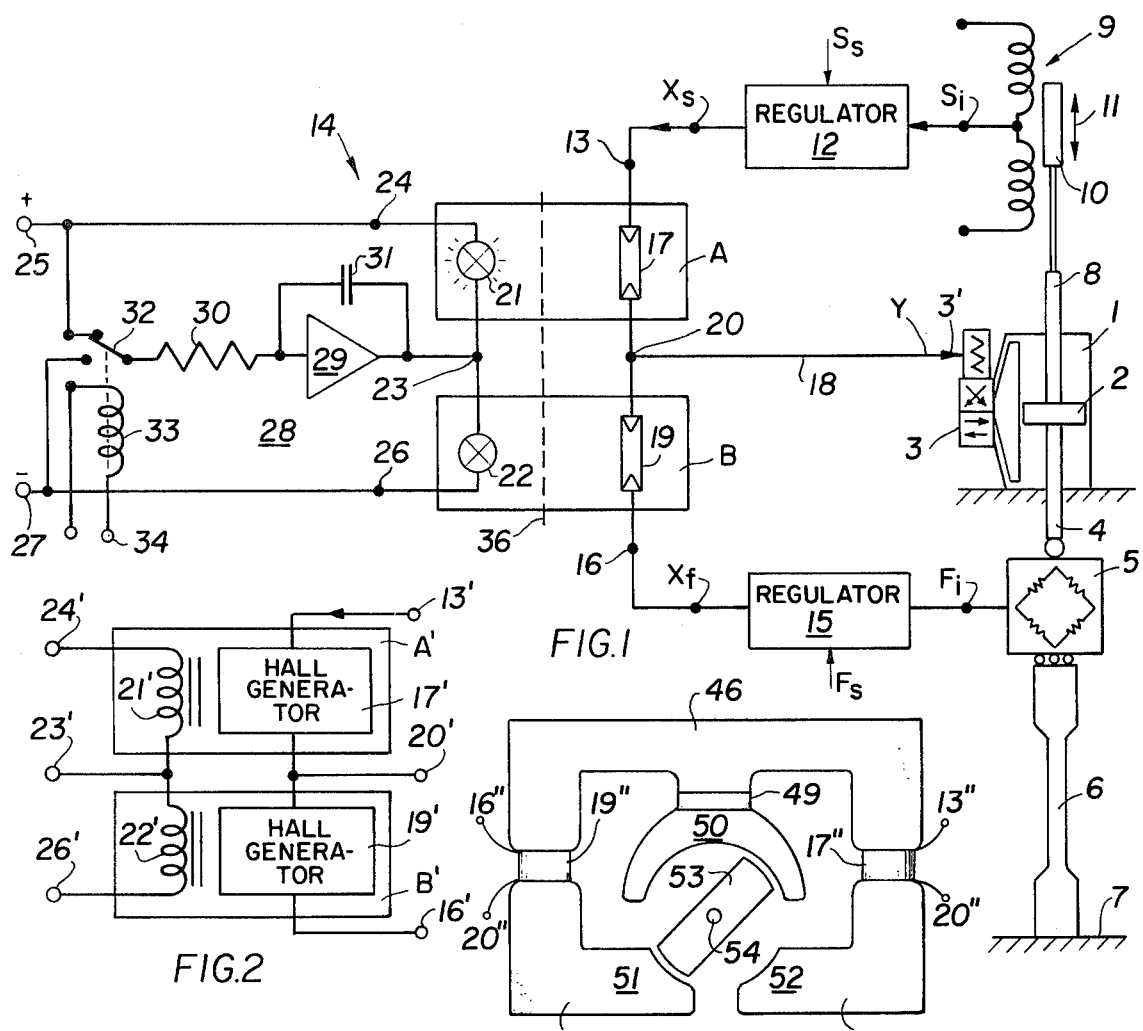
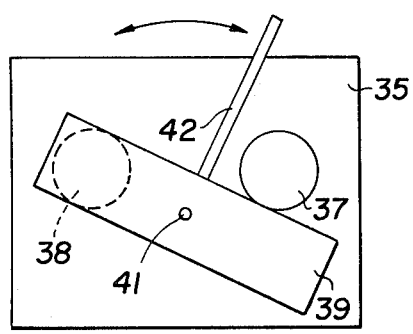
FIG.2
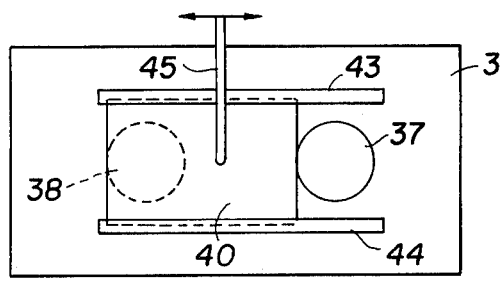
FIG.3
FIG.4
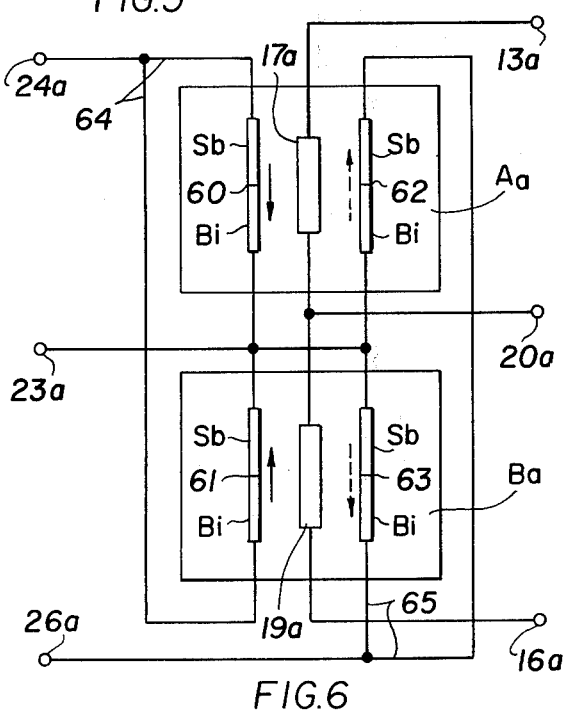

CONTROL INPUT SWITCHING APPARATUS

The present application is a continuation application of my copending application Ser. No. 232,851, filed: Mar. 8, 1972, and now abandoned for "Control Input Switching Apparatus."

BACKGROUND OF THE INVENTION

The present invention relates to a control input switching apparatus. More particularly, the invention relates to a control input switching apparatus suitable for dynamic testing machines, especially those which are driven by hydraulic means. In such machines it is necessary to switch the input of an adjustment member such as a servo valve from its connection to the output of one regulating means into a connection with the output of another regulating means. One of these regulating means or briefly regulators may be responsive to a displacement or length of travel whereas the other regulator may be force responsive.

When the input of the adjustment member is switched from one regulator output to the other, substantial shocks may occur in the testing machine or apparatus unless care has been taken prior to the switch-over that the control deviations of the two regulators are equal to each other. This is quite simple if both control deviations are made equal to zero, for example, by means of a potentiometer. However, making the control deviations equal to zero prior to each switch-over entails returning the control deviations to their rated or normal value after the switch-over. These steps necessarily result in delays and may, under certain circumstances, substantially increase the time required for a given testing program or sequence.

It might be possible to accomplish the switch-over from one regulator to another by means of motor driven potentiometers. However, such motor driven potentiometers have the drawback that they are subject to wear and tear and that the switch-over from one potentiometer to another cannot be accomplished in a smooth manner. Besides, such potentiometers would tend to vary the zero adjustment points or the rated values.

OBJECTS OF THE INVENTION

In view of the foregoing, it is the aim of the invention to achieve the following objects singly or in combination:

to provide a switching apparatus which will assure a smooth transition when the input of a controlled member is switched from the output of one regulator to the output of another regulator;

to avoid in a switch-over of the type here described the need for reducing the controlling quantities to zero for the purpose of the switch-over;

to assure that the switch-over does not cause any shocks in the hydraulically driven dynamic testing machine;

to avoid any varying of the zero adjustment points or rated values of the testing equipment; and to generally avoid the drawbacks of the prior art.

SUMMARY OF THE INVENTION:

According to the invention there is provided an apparatus for switching a control input of an adjustment member such as a servo valve in a hydraulically operated dynamic testing machine, from an output of one regulator to the output of a second regulator wherein variable resistor means connect these outputs to the control input. Varying means are operatively associated with these variable resistor means and the varying means are in turn responsive to controlling means which control the varying means in such a manner that the resistance of one of the resistor means increases while the resistance of the other resistor of the resistor means decreases and vice versa.

Preferably, the resistor means comprise two light sensitive resistors and the varying means comprise two light bulbs arranged so that each light bulb controls one resistor. The light bulbs are preferably energized through an integrating circuit which controls the light bulbs in such a manner that the light of one light bulb increases while the other decreases and vice versa.

In a modified embodiment, the exposure of the light sensitive resistors may be controlled by mechanical means for example by a manually operated shutter. The shutter is arranged so that while opening one aperture, it simultaneously closes to the same extent another aperture and vice versa.

BRIEF FIGURE DESCRIPTION:

In order that the invention may be clearly understood, it will now be described, by way of example, with reference to the accompanying drawings, wherein:

FIG. 1 illustrates a circuit arrangement according to the invention for switching the control input of a servo valve from one regulator to another in a hydraulically operated dynamic testing machine;

FIG. 2 illustrates a portion of the circuit arrangement according to FIG. 1, wherein the light sensitive variable resistor means have been replaced by magnetically variable resistor means;

FIGS. 3 and 4 illustrate shutter means for controlling the light sensitive resistor means;

FIG. 5 shows a magnet arrangement for varying the magnetically variable resistor means; and FIG. 6 is a circuit arrangement similar to FIG. 2 wherein the resistor means are temperature responsive.

DETAILED DESCRIPTION OF EXAMPLE EMBODIMENTS:

FIG. 1 illustrates the testing machine only to the extent necessary for providing sufficient background information for the understanding of the invention. A force is exerted in cylinder 1 on the piston 2 by means of a hydraulic medium the supply of which is controlled by an electrically operated servo valve 3. The force exerted on the piston 2 is transmitted through the piston rod 4 and through a force measuring device 5 to the sample body 6 to be tested. The sample body 6 may, for instance, be supported against the frame structure 7. It is also possible to arrange the force measuring device 5 between the sample body 6 and the frame structure 7.

The piston 2 is connected through a further piston rod 8 to a displacement measuring device 9, for example, comprising inductive coils and a soft iron core 10 which is displaceable in the direction of the double arrow 11 by the piston rod 8. Such displacement measuring devices are well known in the art.

The output $S_i$ of the displacement measuring device 9 is connected to one input of a regulator 12. The regulator 12 has a further input $S_s$ to which is supplied a rated value. The regulator 12 is a comparator circuit which produces at its output a difference value Xs depending upon the two input values or signals Ss and Si. This differential output value Xs or signal is supplied to one input 13 of a switching arrangement 14 according to the invention.

The output signal Fi of the force measuring device 5 is supplied to one input of a further regulator 15 which has another input to which is supplied a rated force signal Fs. The regulator 15 is also a comparator circuit and produces at its output a control deviation Xf depending upon the two signals Fi and Fs at its inputs. The control deviation or difference signal Xf is supplied to another input 16 of the switching arrangement 14. The output of the regulator 12 is connected to the control input 3' of the servo valve 3 through a variable resistor 17 and through a conductor 18 which supplies the regulating signal Y to the input 3'. In the alternative, the output signal of the regulator 15 is supplied to the control input 3' through a variable resistor 19 also connected through said conductor 18 to the input 3'. This conductor 18 is connected to a junction 20 between the two variable resistors 17 and 19. When the variable resistor 17 is small and the variable resistor 19 is large, the regulator signal Xs will be effective as the regulating input signal Y. Vice versa, if the variable resistor 19 is small and the variable resistor 17 is large, the regulator signal Xf will be effective as the regulating input signal Y.

In the example embodiment of FIG. 1 the variable resistors 17 and 19 are light sensitive resistors and these resistors are located in respective chambers A and B together with suitable resistance varying means such as light bulbs 21 and 22. Each chamber A and B contains one resistor and the respective light bulb. These chambers are opaque so that each resistor with its light bulb is screened from the other resistor and its light bulb.

According to the invention, the light bulbs 21 and 22 are connected in series to form a junction 23 there between. The terminal 24 of the light bulb 21 is connected to a power supply source 25 of positive polarity. The terminal 26 of the light bulb 22 is connected to a power supply 27 of negative polarity. The junction 23 is connected in accordance with the invention to an integrator circuit 28 comprising an amplifier 29, an input resistor 30 and a parallel capacitor 31 as well as input switching means such as a contact 32 operated by a relay 33 which in turn may be switched on and off at its input 34.

The circuit arrangement of FIG. 1 operates as follows. As shown the light bulb 21 is energized and the light bulb 22 is dark. However, depending on the time constant of the integrating circuit which time constant is determined by the capacitor 31 connected in parallel to the amplifier 29 and by the input resistor 30 connected between the contact 32 and the amplifier 29, one light bulb will gradually become brighter while the other becomes gradually more dim. The output of the amplifier 29 is connected to the junction 23. The voltage supply to the light bulbs depends on the position of the contact blade 32 which is operated by the relay 33 controllable, for example, by a simple on-off switch at the relay input 34. In the shown position of the contact 32 the integrating circuit is connected to the positive power supply 25 and the light bulb 21 lights up. If now the contact 32 is switched to its other position, whereby the integrator circuit is supplied by the negative power supply 27, the integrator 28 begins to integrate in the opposite direction, and the light bulb 21 becomes slowly dimmer while the light bulb 22 begins to light up more and more. At the same time, the resistor 17 becomes highly resistive while the resistor 19 becomes smaller and smaller. When the light bulb 21 is extinguished, the respective resistor 17 practically becomes a non-conductor and when the light bulb 22 is fully lit up, the resistor 19 constitutes but a small resistance and thus becomes conductive.

As mentioned above, the duration of integration and thus the curve of the brightening and dimming of the light bulbs or rather the variation of the light sensitive resistors may be modified by changing the resistor 30 and/or the capacitor 31.

The invention is not limited to using light sensitive variable resistor means 17 and 19. For example, as illustrated in FIG. 2, magnetically sensitive resistor means such as Hall-generators 17' and 19' may be used instead of the light sensitive resistors. The light bulbs would then be replaced by magnets 21' and 22'. The Hall-generators 17' and 19' are located in respective chambers A' and B' together with the magnets 21' and 22'. Each chamber A' and B' contains one Hall-generator and the respective magnet. These chambers are opaque so that each Hall-generator with its magnet is screened from the other Hall-generator and its magnet. The terminals of FIG. 2 are designated by the same reference numerals as the respective terminals in FIG. 1. However, in order to emphasize the different embodiments, the reference numerals in FIG. 2 have been provided with a '.

Instead of the magnetically responsive resistor means such as Hall-generators still other resistor means may be employed, for example, temperature responsive resistor means may be used whereby each of such temperature responsive resistor means would be arranged for cooperation with a Peltier element. An example of such an element would be a bismuth-telluride combination. Pressure responsive resistor means, for example piezoelectric elements may also be used in combination with respective pressure exerting means. In each of these modifications the temperature generating means or the pressure exerting means could preferably be controlled by the integrator circuit shown in FIG. 1.

The above described effect of increasing one resistance while simultaneously decreasing another resistance could also be achieved in a mechanical manner, for example as illustrated in FIGS. 3 and 4. For this purpose, an opaque plate 35 is inserted between the light sensitive resistor means and the respective light bulbs in a position indicated by a dashed line 36 in FIG. 1. These plates 35 are provided with apertures 37 and 38 which can be opened and closed by a shutter 39 in FIG. 3 or by a shutter 40 in FIG. 4.

The shutter 39 is journalled on a shaft 41 and may be tilted back and forth, for example, by a handle 42. As the aperture 38 is gradually opened, the aperture 37 is gradually closed and vice versa. For this purpose the shaft 41 is located intermediate the center points of the two apertures 37 and 38 but slightly off center of a line connecting the centers of these two apertures. The embodiment of FIG. 4 operates in the same manner except that the shutter 40 is slideable back and forth along guides 43, 44 by a handle 45. In FIG. 3 as well as in FIG. 4, the shutter may also be driven automatically by motor means well known in the art.

FIG. 5 illustrates still another embodiment wherein magnetically responsive resistor means 17'' and 19'' are located in gaps between magnetic circuit means such as magnetic core pieces 46, 47 and 48. The magnetically responsive resistor means 17'' and 19'' may again, for example, be Hall-generators and their terminals 13'' and 16'' correspond to the respective terminals 13 and 16 in FIG. 1. The same consideration applies to the terminals 20''. The means for varying the magnetic fields to which the Hall-generators are exposed comprise a permanent magnet 49 and pole pieces 50, 51, and 52. The means for controlling the varying means comprise a soft iron core 53 supported on a shaft 54. As the soft iron core 53 is rotated, either by hand or by a motor, the field strength in the one gap increases while the field strength in the other gap decreases and vice versa.

The terminals 13a, 16a, 20a and 23a, 24a and 26a of FIG. 6 may be connected to respective terminals 13, 16, 20 and 23, 24, 26 in FIG. 1 if instead of the light sensitive resistors 17 and 19 it is desired to use temperature sensitive resistors 17a and 19a contained in chambers Aa and Ba shown in FIG. 6. The varying means for varying the resistors 17a and 19a comprise conductor couples 60 and 61 in a parallel circuit 64 and conductor couples 62 and 63 in parallel circuit 65. These conductor couples may comprise an antimony member Sb and a bismuth member Bi soldered together at a junction to form a couple exhibiting the Peltier effect. Other conductor combinations may also be used.

If current is supplied through circuit 64, couple 60 will heat up and couple 61 will cool according to the Peltier effect. If current is supplied through circuit 65, couple 63 will heat up and couple 62 will cool. Thus the resistors 17a and 17b are controlled through the integrator circuit of FIG. 1 by means of the Peltier couples of FIG. 6.

Although the invention has been described with reference to specific embodiments, it is to be understood, that it is intended to cover all modifications and equivalents within the scope of the appended claims.

What is claimed is:

1. An apparatus for switching a control input of an adjustment member in a material testing machine from an output of a first regulating means of said material testing machine to an output of a second regulating means of said material testing machine and vice versa, comprising first variable resistor means directly connected to said control input to continuously apply the output of said first regulating means to said control input independently of the voltage at said control input, second variable resistor means directly connected to said control input to continuously apply the output of said second regulating means to said control input independently of the voltage at said control input, whereby the proportion of the outputs of said regulating means at said control input of the adjustment member is dependent upon the resistance of said first and second resistor means respectively, varying means operatively coupled to said first and second variable resistor means for varying the resistance thereof, and means for controlling said varying means whereby the resistance of one of said first and second variable resistor means is increased while the resistance of the other of said first and second variable resistor means is simultaneously decreased and vice versa.

2. The apparatus according to claim 1, wherein said first and second variable resistor means comprise light sensitive resistor means.

3. The apparatus according to claim 1, wherein said first and second variable resistor means are Hall generators.

4. The apparatus according to claim 1, wherein said first and second variable resistor means are temperature responsive resistor means.

5. The apparatus according to claim 1, wherein said first and second variable resistor means are pressure responsive resistor means.

6. The apparatus according to claim 1, wherein said first and second variable resistor means are first and second variable light sensitive resistor means, wherein said varying means are first and second light source means arranged for providing a light exposure for said first and second light sensitive resistor means, and wherein said means for controlling said varying means are exposure control means comprising a separate opaque chamber for each light sensitive resistor means, an aperture in each chamber for passing light from said light source means to the respective light sensitive resistor means, shutter means for closing said apertures, and actuating means operatively connected to said shutter means for selectively opening and closing said apertures.

7. The apparatus according to claim 6, wherein said shutter means comprise an elongated plate having aperture closing ends, said actuating means comprising a shaft, means for rigidly securing said plate to said shaft, means for rotatably supporting said shaft in such a position intermediate said apertures that rotation of the shaft will move said plate ends across said apertures in a closing and opening sense respectively.

8. The apparatus according to claim 7, wherein each aperture has a center, said shaft being located with its longitudinal axis intermediate said centers but off center relative to a line connecting said aperture centers.

9. The apparatus according to claim 7, wherein said shutter means comprise an elongated plate having aperture closing ends, said apparatus further comprising guide means for said plate, said actuating means comprising means operatively connected to said plate for shifting said plate back and forth along said guide means for opening one of said apertures while simultaneously closing the other aperture and vice versa.

10. The apparatus according to claim 1, wherein said first and second variable resistor means are Hall-generators, said varying means comprising magnetic circuit means with first and second gaps therein, said first and second Hall-generators being located in said first and second gaps respectively, said means for controlling the varying means including a rotatable soft iron core arranged in said magnetic circuit means, and means for rotating said soft iron core for varying the magnetic fields through said gaps.

11. The apparatus according to claim 10, wherein said magnetic circuit means comprise a permanent magnet.

12. An apparatus for switching a control input of an adjustment member from an output of a first regulating means to an output of a second regulating means and vice versa, comprising first variable resistor means connected to continuously apply the output of said first regulating means to said control input, second variable resistor means connected to continuously apply the output of said second regulating means to said control input, whereby the proportion of the outputs of said regulating means at said control input is dependent upon the resistance of said first and second resistor means respectively, varying means operatively coupled to said first and second variable resistor means for varying the resistance thereof, and means for controlling said varying means, whereby the resistance of one of said first and second resistor means is increased while the resistance of the other of said first and second resistor means is being decreased and vice versa, said means for controlling the varying means comprising integrator circuit means connected to said varying means, said integrator circuit means including an input and means for alternately connecting said input of the integrator circuit means to different polarities for providing an electrical supply to said varying means which supply increases and decreases depending upon the respective polarity supplied to said input of the integrator circuit means, whereby an additive signal combination is supplied to said control input of said adjustment member.

13. The apparatus according to claim 12, wherein said first and second variable resistor means comprise respective first and second light sensitive resistor means, wherein said varying means comprise light source means arranged for cooperation with said first and second light sensitive resistor means and connected to said integrator circuit means to provide an increasing and a decreasing light exposure for said first and second light sensitive resistor means.

14. The apparatus according to claim 13, further comprising opaque means for screening one of said light sensitive resistor means and its respective light source means from the other light sensitive resistor means and its light source means.

15. The apparatus according to claim 12, wherein said first and second variable resistor means comprise first and second Hall-generator means, said varying means comprising magnet means including electrical coils for creating varying magnetic fields, said Hall-generator means being disposed to be conrolled by said varying magnetic fields, said electrical coils of said magnet means being connected to said integrator circuit means.

16. The apparatus according to claim 12, wherein said first and second variable resistor means comprise respective first and second temperature responsive resistor means, said varying means including first and second Peltier elements arranged for cooperation with the respective first and second temperature responsive resistor means, said first and second Peltier elements being connected to said integrator circuit means.

17. The apparatus according to claim 12, wherein said first and second variable resistor means comprise respective first and second pressure responsive resistor means.

18. The apparatus according to claim 12, wherein said varying means comprise two members each having an input and both having a common input terminal, said integrating circuit means comprising a positive voltage source connected to the input of one of said varying members, a negative voltage source connected to the input of the other of said varying members, an active integrating means, an integrator output connected to said common input terminal between said varying means, an integrator input, and switching means for connecting said integrator input to one of said voltage sources at a time whereby the supply voltage for said varying means is increased and decreased in response to the polarity of the voltage at said integrator input.

19. The apparatus according to claim 18, wherein said active integrating means comprise an amplifier having an output connected to said common input terminal and an amplifier input, a resistor for connecting said amplifier input to said switching means, and a capacitor connected in parallel to said amplifier.

20. In an apparatus for applying a control signal to a single control input of an adjustment member in a testing machine by switching said control input from an output of a first regulating means to an output of a second regulating means and vice versa, the improvement comprising first and second variable resistor means connected to form a series connection with each other, said series connection having outer ends connected to the output of the respective regulating means, said series connections having a tap intermediate its ends connected to said single control input, resistor varying means operatively associated with said first and second variable resistor means respectively, and means for controling said varying means to increase the resistance of one of said two variable resistors while simultaneously decreasing the resistance of the other of said variable resistors and vice versa, whereby said control signal applied to said control input of said adjustment member comprises an increasing signal component from the regulating means with the variable resistor, the resistance of which is being decreased and a decreasing signal component from the regulating means with the variable resistor the resistance of which is being increased.

* * * * *